United States Patent Office 3,558,563
Patented Jan. 26, 1971

3,558,563
CARBAMYLALKYLATED POLYESTER RESIN
Arthur L. Cunningham, Park Forest, Ill., assignor to The Sherwin-Williams Company, Cleveland, Ohio, a corporation of Ohio
No Drawing. Filed Oct. 17, 1967, Ser. No. 675,801
Int. Cl. C08g 9/20
U.S. Cl. 260—72
12 Claims

ABSTRACT OF THE DISCLOSURE

Polyesters of a polycarboxylic acid and a polyhydric alcohol and containing free OH groups are condensed with an alpha-beta unsaturated acid amide to carbamylalkylate the polyester to produce a novel carbamylalkylated polyester. This may then be alkylolated by treatment with a low molecular weight aldehyde to produce a thermosetting resin useful as a protective coating or as a component in a coating composition. The resultant product may be denominated an N-alkylolated amidolakyl ether of an hydroxyl containing polyester.

---

This invention relates as indicated to a new carbamylalkylated polyester resin, to coating compositions containing such polyesters, and to the process for preparing said polyester resins. The invention is more particularly concerned with the preparation of thermosetting polyesters derived from at least one polycarboxylic acid and at least one polyhydric alcohol having a surplus of hydroxyl groups which are further modified with acrylamide or methacrylamide and formaldehyde.

The term "polyester," as used herein, refers to polymers made by reading monomeric carboxylic acids wherein at least one of the carboxylic acids has a carboxyl functionality in excess of one, and alcohols wherein at least one of the alcohols has a functionality in excess of one, and wherein the monomer or mer units recur two or more times in the molecule. Such polyesters are referred to in the prior art as "alkyl resins," particularly if they contain in their composition a monocarboxylic aliphatic or fatty acid or its triglyceride. The polyesters of this invention are, furthermore, thermosetting since with the application of heat and catalyst they are converted to tough, insoluble films.

The thermosetting polyesters currently in use consist of a polyester having a surplus of hydroxyl groups which are mixed with a urea-formaldehyde, melamine-formaldehyde, benzoguanamineformaldehyde or alternately a polyisocyanate. Another common thermosetting polyester or alkyd converts as a result of the thermal reaction between unsaturated fatty acids incorporated in the resin formulation.

The polyester compositions of the present invention provide a material which converts to a tough, insoluble film without recourse to blended crosslinking resins such as urea-formaldehyde, melamine-formaldehyde or others previously named. There is provided a thermosetting polyester useful without recourse to unsaturated fatty acids which adversely affect color stability when subjected to elevated temperatures. The thermosetting materials hereof can be blended with other resins having hydroxyl, amine or carboxyl functional groups to form mutually compatible, stable resin solutions which can be coated onto a surface and converted to tough, solvent resistant coatings suitable for use in forming protective, decorative coatings for a wide range of industrial products.

In accordance with the invention, a new and unique thermosetting polyester is formed when the product of condensation of at least one polycarboxylic acid and at least one polyol, with possible additional reactants included which have carboxyl or hydroxyl moieties, are condensed into hydroxyl functional polyester resins. These polyester resins are further dissolved in inert solvent and modified with an alpha-beta unsaturated $C_3$ to $C_8$ aliphatic acid amide such as acrylamide, methacrylamide, ethacrylamide, crotonic acid amide, isocrotonic acid amide, isohydrosorbic acid amide, vinylacrylamide and the like in the presence of a suitable basic catalyst. The amide modified polyester is then further reacted with a $C_1$ to $C_4$ aldehyde, such as formaldehyde, acetaldehyde, propionaldehyde, etc., in a buffered medium.

As examples of monobasic acids which can be employed in preparing the initial polymeric polyesters, the following may be mentioned—saturated aliphatic monocarboxylic acids containing from 7 to 20 carbon atoms, both linear and branched, derived from synthetic or natural sources; benzoic acid, aliphatic substituted benzoic acid; unsaturated aliphatic acids such as those derived from vegetable sources; and aliphatic or aromatic acids containing in their structure inert moieties such as halogen, ether or thioether, tertiary amine, or similar types. The triglycerides or the methyl or alkyl esters of the monocarboxylic acids can be employed by utilizing well established "alcoholysis" or transesterification techniques.

The polybasic acids useful herein contain from 4 to 40 carbon atoms, preferably from 4 to 8 carbons. As examples of polybasic acids suitable for the preparation of the initial polymeric polyesters, the following may be mentioned—o-phthalic or its anhydride, isophthalic, terephthalic, adipic, malonic, maleic and its anhydride, fumaric, azelaic, sebacic, tetrahydrophthalic and is anhydride, hexahydrophthalic and its anhydride, endomethylene tetrahydrophthalic and its anhydride, hexachloroendomethylene tetrahydrophthalic and its anhydride, dimerized vegetable fatty acids, hydrogenated dimerized vegetable fatty acids, diglycolic or thiodiglycolic, trimellitic and its anhydride, pyromellitic and its anhydride, 1,3,5-pentane tricarboxylic, citric acid or itaconic acid. Obviously, the methyl esters of the dibasic acids listed could be utilized in the practice of this invention by means of reacting by transesterification versus the normal esterification route.

The polyols useful herein contain from 2 to 20 carbon atoms generally, and preferably from 2 to 6 carbons. The following polyols are examples of those appropriate for the preparation of the initial polyester resin compositions of the present invention—butylene glycol; 1,4-bis-2-hydroxyethyl thioether; butylene glycol-1,3; 1,4-cyclohexanedimethanol; dibromoneopentyl glycol; diethylene glycol; dipropylene glycol; bis-2-hydroxyethoxy-Bisphenol A; hydroxy pivalyl hydroxy pivalate; ethylene glycol; 1,6-hexanediol; hydrogenated Bisphenol A; methyldiethanol amine; neopentyl glycol; 1,5-pentanediol; propylene glycol; 2,2,4-trimethyl-3-pentanediol; 1,3-propane diol, dipentaerythritol; glycerine 1,2,6-hexanetriol; pentaerythritol; sorbitol; hydrogenated sugars; trimethylol ethane; trimethylol propane and various ethoxylated or propoxylated polyols or polyamines. Certain oxiranes may be utilized, such as glycidyl esters of carboxylic acids or glycidyl ethers of alcohols or alkyl monooxides, such as propylene oxide, 1,2-butylene oxide or oxides of alpha olefines.

In preparing the initial polyester resin composition, monoanhydrides which are intramolecular anhydrides of monocarboxylic acids, and monohydric alcohols are utilized. The monoanhydrides which may be used include: phthalic anhydride; halogen substituted phthalic anhydride; tetrahydrophthalic anhydride; hexahydrophthalic anhydride; endomethylene tetrahydrophthalic anhydride and hexachloroendomethylene tetrahydrophthalic anhydride. The monohydric alcohols which may be used are $C_2$–$C_{12}$ alcohols and include: ethanol; isopropanol; n-propanol; n-butanol; isobutanol; t-butanol; mixed butanols; 2-ethyl hexanol; n-hexanol; octyl alcohol; alkyl substituted benzyl alcohol; halogen substituted benzyl alcohol; cyclohexanol; tetrahydrofurfuryl alcohol; hydrogenated rosin; crotyl alcohol; allyl alcohol and ethoxylated or propoxylated monohydric alcohols.

In the preferred method of preparation of the resin compositions of the present invention, the diol and a dibasic acid are charged into a reaction vessel and reacted at from 325° to 450° F. for three hours to provide a partially reacted linear polymeric polyester. A tight system provided with a fractionating column to insure the separation of the water formed during the reaction from the unreacted diol is preferred. The monohydric alcoholmonoanhydride half ester is prepared in a separate reaction vessel before or simultaneously with the preparation of the partially reacted linear polyester. This is accomplished by first charging the monohydride and heating to fusion. The monohydric alcohol is charged gradually so as to eliminate reflux. The reaction is complete upon addition of all of the monohydric alcohol, and the monohydric alcohol-monoanhydride half ester is held at a slightly elevated temperature to be charged into the partially reacted polyester along with the branching polyol. The reaction vessel used for preparing the monhydric alcohol-monoanhydride half ester should preferably be provided with total reflux. This is not absolutely essential since even the more volatile alcohols can be added with little or no reflux by adjusting the addition rate. The monohydric alcohols-monoanhydride half ester based on lower alcohols are solids at room temperature. However, they can be held for short times at room temperature as supercooled liquids if this is desired.

The branching polyol and monohydric alcohol-monohydride half ester are charged simultaneously with a small quantity of entraining solvent (e.g., xylene or toluene) and the resin reaction is completed in the normal fashion at 400° to 450° F. until the desired final acid value is reached. The finished resin is then dropped into a thinning tank provided with solvent to obtain the final desired resin solution.

To illustrate a preferred mode of preparing hydroxyl-containing polyesters useful in accordance herewith, for carbamyl-alkylation and alkylolation, the following examples are set forth. These examples are set forth primarily for the purpose of illustration.

EXAMPLE 1

(A) Into a suitable reaction vessel equipped with a thermometer, stirrer, fractionating primary condenser, total condenser and trap, inert gas inlet, there was introduced 4.06 moles of adipic acid (594 g.); 6.09 moles of isophthalic acid (1011 g.) and 10.64 moles of neopentyl glycol (1106 g.). This was heated to 325° F. whereupon reaction began, and the temperature was gradually increased to 450° F. over a period of two hours. During this period 230 ml. of water was removed from the reaction.

(B) In a separate suitable reaction vessel provided with an agitator, total reflux condenser and dropping funnel, there was introduced 1 mole of phthalic anhydride (148 g.) which was heated to fusion at 300° F. whereupon 1 mole of isobutyl alcohol (74 g.) was gradually added over a period of one minute. Little or no reflux occurred. A final acid value of 254 was obtained using alcohol-free acid solution.

(C) Into the partially reacted resin of A which was being held at 450° F. were introduced, 1.00 mole of trimethylol propane (134 g.) and 1.00 mole of the isobutylphthalic anhydride half ester (222 g.), of B. This was held until the acid value was 10 and diluted to 60% solids in xylene. Approximately two percent of the isobutyl alcohol charged was present in the water removed, as analysis by gas liquid chromatography established. A clear resin solution resulted which had a Gardner Holdt X viscosity and a Gardner color of less than one.

EXAMPLE 2

Step A of Example 1 is repeated in all details with respect to processing except that the reactants charged to the reaction vessel are as follows: 4.06 mole of adipic acid (594 g.), 6.92 mole of neopentyl glycol (720 g.), 6.09 mole of isophthalic acid (1011 g.).

Step B of Example 1 is repeated in all details with respect to processing except 5.00 moles of phthalic anhydride (740 g.) and 5 moles of isobutyl alcohol (370 g.) are charged to yield 5 moles of isobutyl phthalic half ester (1100 g.).

Step C of Example 1 is repeated in all details except that 5 moles of isobutyl phthalic half ester prepared in Step B (1100 g.) and 5 moles of trimethylolpropane (670 g.) are added to the partially reacted linear polyester of A. The resulting resin carried to an acid value of 10 has a Gardner Holdt viscosity of Y and a Gardner color of less than one at 60% solids in xylene.

EXAMPLE 3

Step A of Example 1 is repeated in all details with respect to processing except 4.06 moles of adipic acid (594 g.), 12.33 moles of neopentyl glycol (1282 g.) and 6.09 moles of isophthalic acid (1011 g.) are charged into the reaction vessel.

Step B of Example 1 is repeated in all details with respect to processing except the reactants charged to the reaction vessel are as follows: 1.18 moles of phthalic anhydride (175 g.) and 1.18 moles of isobutyl alcohol (87 g.) to yield 1.18 moles of isobutyl phthalic half ester (262 g.).

Step C of Example 1 is repeated in all details with respect to processing except the reactants charged to the reaction vessel are as follows: 1.18 moles of isobutyl phthalic half ester (262 g.). The resultant resin thinned to 60% solids in xylene has a Gardner Holdt viscosity of G and a Gardner color of less than one when reacted to a 10 acid value.

EXAMPLE 4

Step A of Example 1 is repeated in all details with respect to processing except 4.06 moles of adipic acid (594 g.), 12.33 moles of neopentyl glycol (1282 g.) and 6.09 moles of isophthalic acid (1011 g.) are charged into the reaction vessel.

Step B of Example 1 is repeated in all details with respect to processing except the reactants are as follows: 1.18 moles of phthalic anhydride (175 g.) and 1.18 moles of isooctyl alcohol (153 g.) to yield 1.18 moles (328 g.) of octyl phthalic half ester which has an acid value of 195 when titrated with alcohol-free potassium hydroxide.

Step C of Example 1 is repeated in all details except 1.18 moles of isooctyl phthalic half ester is added to the partially reacted polyetser. After the resin is processed to a final acid value of 10 and diluted to 60% solids with xylene, the final polyester has a Gardner Holdt viscosity of G and a Gardner color of one.

EXAMPLES 5, 6 AND 7

The processing steps A, B and C of Example 1 are repeated in all details except the reactants given in the following table are charged.

|  | Example 5 | | Example 6 | | Example 7 | |
| --- | --- | --- | --- | --- | --- | --- |
|  | Moles wt. | Grams | Moles wt. | Grams | Moles wt. | Grams |
| Isophthalic acid | 9.04 | 1,500 | 9.04 | 1,500 | 9.04 | 1,500 |
| Neopentyl glycol | 2.29 | 238 | 2.29 | 238 | 2.29 | 238 |
| Phthalic anhydride | 4.00 | 592 | 4.00 | 592 | 4.00 | 592 |
| Isobutyl alcohol | 4.00 | 296 |  |  |  |  |
| Isooctyl alcohol |  |  | 4.00 | 520 |  |  |
| Benzyl alcohol |  |  |  |  | 4.00 | 423 |
| Trimethylol ethane | 7.40 | 899 | 7.40 | 899 | 7.40 | 899 |
| Total | 26.73 | 3,525 | 26.73 | 3,794 | 26.73 | 3,661 |
| Solids in xylene (percent) | 60 |  | 60 |  | 60 |  |
| Gardner Holdt viscosity | $Z_1-Z_2$ |  | $Z_1-Z_2$ |  | $Z_1-Z_2$ |  |
| Gardner color | >1 |  | >1 |  | >1 |  |

In the practice of this invention, polyester resins may also be prepared by reacting carboxylic acids, at least one of which is polyfunctional, and alcohols, at least one of which is polyfunctional, to yield soluble polyester resins having a hydroxyl number between 20 and 300 mg. KOH/g., as do those illustrated in Examples 1 to 7. The formulation of such polyesters has been widely published in the prior art and is well covered in a review authored by R. G. Mraz and R. P. Silver in volume 1, pp. 663–734 of the Encyclopedia of Polymer Science and Technology published in 1964 by John Wiley and Sons, Inc., the disclosure of which is incorporated herein by reference thereto.

The polyester resins such as those illustrated above are dissolved in an inert solvent, such as xylene, and further modified by charging 0.3 to 2.0 moles of an alpha-beta unsaturated acid amide such as acrylamide or methacrylamide, per equivalent of hydroxyl in the polyester with suitable basic catalyst and free radical inhibitor. A carbamylethylation as depicted in the equation given below ensues.

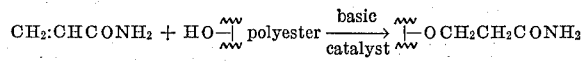

Pendant, reactive amide groups are thus formed along the polyester backbone. This reaction can be followed by monitoring the disappearance of the monomeric amide peak on a Waters Associates, Inc. Gel Permeation Chromatograph using low porosity maximum columns of sufficient resolving power to completely resolve the amide from the polyester resin and the inert solvent. The distribution of the pendant amide groups in the final polyester can be determined by observing the distribution of the infrared amide adsorption band at 6.1 or 6.4, in Gel Permeation Chromatograph fractions of the modified polyester. Results from these analytical procedures indicate that useful thermosetting compositions result even when carbamylethylation is incomplete. In this context, a useful thermosetting composition is defined as a single phase, clear resin solution which crosslinks upon the application of heat as described further below.

Suitable free radical inhibitors for the practice of this invention include those normally used to stabilize vinyl monomers such as hydroquinone, p-methoxy phenol, tert-butyl catechol or others reported in the prior art as useful for this purpose. Inhibitor levels range from 0.5 to 5 millimoles per mole of amide used.

Catalysts which may be utilized for the practice of this invention include: quaternary amine hydroxides, alkali metal hydroxides or alkoxides, quaternary amine microreticular ion exchange resins in the hydroxyl form, or alkali metal amides. Sodium methoxide is a preferred catalyst for the practice of this invention. Catalysts levels range from 5 to 100 millimoles per mole of amide.

The carbamylethylated polyester formed during the previous step is further modified by reacting with an aldehyde in a buffered solution. 1.2 to 5 moles per mole of basic catalyst of a carboxylic acid such as maleic anhydride are used to buffer the solution to a pH of 6 to 3, and 1.2 to 2.0 mole formaldehyde for example is added per mole of amide along with in excess of two moles of butanol, isobutanol, isopropanol or other monohydric alchol from $C_1$ to $C_8$. Butanol or isobutanol is preferred. Formaldehyde in the form of the hemibutyral is preferred. Alkylolation of the pendant carbamyl groups, and alkylation of the alkylol moiety are the main reactions which take place during this step of the process.

It is necessary as a final refinement of the thermosetting polyester of the present invention to remove the sodium, alkali metal or quaternary amine ion present, since these inhibit the cure of coatings comprised of said polyester, acid catalyst, and inert pigments. Strong acid ion exchange resins, particularly those of the microreticular type, are applicable for this purpose. A preferred method consists of charging an attapulgus clay such as "Attaclay" to the completed resin and filtering. The addition of a weighed amount of attapulgus clay equal to twenty times the weight of alkali metal or quaternary amine catalyst utilized for carbamylethylation step brings the sodium to a sufficiently low level that it no longer adversely affects the final cure. This refinement is not required if an ion-exchange resin is used as a catalyst for the carbamylalkylation step.

In order that the concept of the present invention may be more completely understood, the following examples are set forth. These examples are set forth primarily for the purpose of illustration. The quantities are stated by weight unless otherwise indicated.

EXAMPLE 8

To a five-liter flask fitted with a 300 mm. partially packed Allihn condenser used as a primary condenser to fractionate the reaction vapors, a Friedrichs condenser affixed so as to totally condense the vapor passing through the primary condenser and pass them into a receiver, a thermometer and an agitator were charged; 594 g. adipic acid, 1011 g. isophthalic acid and 1057 g. neopentyl glycol. The mixture was rapidly heated to 350° F. whereupon the temperature of the reaction vessel was gradually increased to 460° F. Upon reaching 460° F., 680 g. of TMP was added and the reaction was carried on at this temperature until the acid value was 10 mg. KOH/g. 1288 g. of xylene were then added.

A Barrett trap and a Friedrich condenser were then fitted to a flask in place of the Allihn primary condenser and Friedrichs total condenser setup, and 1233 g. of the polyester solution prepared above was charged. 100 g. of xylene was distilled off to remove any water present, and 150 g. acrylamide, 1 g. t-butyl catechol, and 6 g. of sodium methoxide were charged into the flask. The mixture was held at the reflux temperature of xylene for two hours to partially carbamylethylate the polyester. The reaction mixture was then cooled, and 364 g. of isobutyl formaldehyde and 10 g. of maleic anhydride were added. The isobutyl formaldehyde used was a commercial grade containing 40 parts formaldehyde, 7 parts water and 53 parts isobutyl alcohol. The mixture was held at 220° F. at reflux for 1½ hours. At this time 50 g. of Attaclay were added, and the resin was agitated for 5 minutes and filtered. A clear resin having a Garden color of 3 and a Gardner Holdt viscosity of E–F resulted.

The resin resulting from this example was catalyzed with various acid catalysts and coated onto an aluminum panel with a 3 mil drawdown knife and cured in a 500° F. oven. The results of these cures are tabulated below.

| Catalyst | Cure time (SEC) | Rubs MEK | Color |
|---|---|---|---|
| 2% Cyzac 1010 | 90 | 12 | None. |
| Do | 180 | 21 | Very slight. |
| 2% Paratoluene sulfonic acid | 90 | 72 | Do. |

All the cured films were tough, hard, and unaffected by xylene or Butyl Cellusolve (ethylene glycol monobutyl ether). They had excellent adhesion and flexibility on aluminum, and were not penetrated by an "F" hardness lead pencil.

EXAMPLE 9

In a five-liter flask as specified in Example 8 were added: 594 g. adipic acid, 1011 g. isophthalic acid and 1250 g. neopentyl glycol. The temperature was brought rapidly to 350° F. and gradually to 460° whereupon 740 g. of trimethylolpropane were added. The polyester was reacted at this temperature until the acid value reached 10, and 1386 g. of xylene were added.

The flask was set up with a Barrett trap, and 100 g. of xylene were distilled off to insure the removal of water. 1 g. t-butyl catechol, 10 g. sodium methoxide and 692 g. of acrylamide were added, and the reaction was continued for two hours at the refluxing temperature of xylene. 20 g. of maleic anhydride, 1350 g. of isobutyl formaldehyde and 320 g. isobutyl alcohol were then added. The reaction was carried on for 4 hours at refluxing during which time 311 g. water was collected in the Barrett trap. 60 g. of Attaclay were then added and the resin filtered. The resulting resin had the following properties: Gardner color 1; Gardner Holdt viscosity M; sp. gr. 1.040; percent nonvolatile 59. The resin was further catalyzed with 2% Cyzac 1010 (commercially available p-toluene sulphonic acid catalyst) and a film was cast on an aluminum panel and cured for 20 minutes at 350° F. The resulting film was not penetrated by a 3H lead pencil, had resistance to over 150 rubs with a methyl ethyl ketone saturated rag, and showed no discoloration.

EXAMPLE 10

Into a five-liter flask fitted with a Barrett trap and reflux condenser, thermometer and agitator inert gas cover, are charged: 624 g. coconut oil, 116 g. trimethylol ethane, 100 g. glycerine and 1 g. lithium ricinoleate. The contents are heated to 400° F. until compatible with an aliquot of phthalic anhydride. 887 g. phthalic anhydride, 224 g. trimethylol ethane, and 149 g. glycerin are then charged into the flask, and the polyester is processed at 420° F. to an acid value of 8. 1308 g. xylene are then added.

After distilling off 100 g. of solvent to remove any water in the reaction mixture, 460 g. acrylamide, 1 g. t-butyl catechol, and 6 g. sodium methoxide are added. The reaction mixture is held at reflux for three hours, whereupon 20 g. maleic anhydride and 900 g. isobutyl formaldehyde are added. The reaction is continued at reflux temperature for four to six hours during which time 178 g. of water are collected in the trap. 50 g. of Attaclay are then added, and the resin is filtered.

EXAMPLE 11

Into a five-liter flask fitted with a Barrett trap and reflux condenser, inert gas cover, thermometer and agitator are charged: 533 g. tall oil fatty acid (4% rosin), 79 g. glycerine, 274 g. pentaerythritol, 449 g. phthalic anhydride, and 148 g. benzoic acid. The reaction mixture is esterified at 460° F. to an acid value of 25 whereupon 1,000 g. of xylene are added.

After distilling off 100 g. of solvent to remove any water in the reaction mixture, 110 g. of acrylamide, 1 g. t-butyl catechol and 6 g. sodium methoxide are added. The mixture is held at the reflux temperature of xylene for two to five hours to partially carbamylethylate the poly-ester. The reaction mixture is then cooled, and 266 grams of an isobutyl formaldehyde solution and 10 g. of maleic anhydride are added. The isobutyl formaldehyde used is a commercial grade containing 40 parts formaldehyde, 7 parts water and 53 parts isobutyl alcohol. The mixture is held at 200° F. at reflux for 1½ hours. At this time 50 g. of Attaclay is added, and the resin is agitated for 5 minutes and filtered. A clear resin results which cures to a tough, solvent resistant film when baked 20 minutes at 350° F.

EXAMPLES 12–19

Recipes for gloss enamels utilizing the carbamylated resins of the present invention are set forth as examples of practical industrial coatings containing these resins. Several recipes include other resins, which, by virtue of the broad compatibility of many of these resins, can be included in useful formulations.

| | Example— | | | |
|---|---|---|---|---|
| | 12 | 13 | 14 | 15 |
| Resin Example 9 | 167 | 42 | 84 | 128 |
| Acrylic resin Solution A | | 150 | 100 | 50 |
| Cyzac 1010 | 2 | 2 | 2 | 2 |
| Rutile TiO$_2$ | 130 | 130 | 130 | 130 |
| Xylene | 83 | 58 | 66 | 72 |

The acrylic resin solution A is an aldehyde-reacted interpolymer of acrylamide, ethyl acrylate and styrene as set forth in U.S. Pat. 2,870,117, Example VII (50% solids).

| | Example— | | |
|---|---|---|---|
| | 16 | 17 | 18 |
| Resin Example 9 | 128 | 150 | 150 |
| Acrylic resin Solution B | 50 | | |
| Vinyl resin solution | | 25 | |
| Cellulose acetate butyrate solution | | | 25 |
| Cyzac 1010 | 2 | 2 | 2 |
| Rutile TiO$_2$ | 130 | 130 | 130 |
| Cyclohexanone | 72 | 75 | 75 |

The acrylic resin solution B is an acrylic interpolymer composed of 15 parts 2-hydroxyethyl methacrylate, 45 parts ethyl acrylate and 40 parts styrene dissolved at 50 percent nonvolatile content in a solvent comprised of 80 parts xylene and 20 parts n-butanol.

Vinyl resin solution is a commercial poly(vinyl chloride-vinyl alcohol) vinyl resin diluted to 40 percent solids in a solvent blend comprised of 60 parts xylene and 40 parts cyclohexanol.

The cellulose acetate butyrate solution is an Eastman EAB 551.02 cellulose acetate butyrate diluted to 40 percent solids in a solvent blend comprised of 80 parts xylene and 20 parts cyclohexanone.

EXAMPLE 19

| | |
|---|---|
| Resin Example 11 | 200 |
| Cyzac 1010 | 2 |
| Rutile TiO$_2$ | 130 |
| Xylene | 50 |

The invention provides new and improved thermosetting polyesters which do not *require* additional crosslinking resins although such may be used with the resins hereof. There are applicable for a wide range of industrial coatings such as the coating of major appliances, automobiles and aluminum and steel coil stock which may be post formed in the fabrication of a wide range of products.

What is claimed is:

1. An amido alkyl ether of a resinous hydroxyl-containing polyester of at least one polycarboxylic acid and at least one polyhydric alcohol said polyester having an hydroxyl number in the range of from 20 to 300 mg. of KOH per gram produced by condensing said polyester and .3 to 2 moles of alpha-beta unsaturated acid amide selected from the group consisting of acrylamide and methacrylamide per equivalent of hydroxyl in said polyester in the presence of basic catalyst and free radical inhibitor.

2. An amido alkyl ether of an hydroxyl-containing polyester in accordance with claim 1 in which the amido alkyl group contains from 3 to 8 carbon atoms.

3. An N-alkylolated amido alkyl ether in accordance with claim 1 produced by reacting the resinous product of claim 1 with 1.2 to 2 moles aldehyde per mole of amide and in excess of two moles of monohydric alcohol containing $C_1$ to $C_8$ carbon atoms in a buffered solution.

4. An N-alkylolated amido alkyl ether in accordance with claim 3 wherein the amido alkyl group contains 4 carbon atoms.

5. An N-alkylolated amido alkyl ether in accordance with claim 4 wherein the alkylol group is methylol.

6. An N-alkylolated amido alkyl ether in accordance with claim 3 wherein the amido alkyl group contains 3 carbon atoms.

7. An N-alkylolated amido alkyl ether in accordance with claim 3 wherein the amido alkyl group contains 4 carbon atoms.

8. An amido alkyl ether of a resinous hydroxyl polyester in accordance with claim 1 in which at least one polycarboxylic acid is o-phthalic acid or its anhydride.

9. An amido alkyl ether of a resinous hydroxyl polyester in accordance with claim 1 in which at least one polyhydric alcohol is trimethylolpentane.

10. An N-alkylolated amido alkyl ether of an hydroxyl-containing polyester in accordance with claim 1 in which the polyester is internally plasticized with from 0.01 to 0.25 mol fraction of the total resin of a half ester of a monohydric alcohol and a monoanhydride of an organic dicarboxylic acid.

11. A polyester composition as claimed in claim 10 wherein the monoanhydride is phthalic anhydride and the monohydric alcohol is a $C_2$ to $C_{12}$ alcohol.

12. A polyester composition as claimed in claim 11 wherein the alcohol is isobutyl alcohol.

References Cited

UNITED STATES PATENTS

| | | | |
|---|---|---|---|
| 3,254,039 | 5/1966 | Burrell et al. | 260—22 |
| 2,420,730 | 5/1947 | Woodward | 260—72 |
| 2,956,964 | 10/1960 | Christenson et al. | 260—72 |
| 3,249,564 | 5/1966 | Haskell et al. | 260—72 |
| 3,265,653 | 8/1966 | Le Blanc | 260—72 |

OTHER REFERENCES

Chem. Abst., vol. 65: 15619b (1966), Sekmakas, "Acrylamide Resin Coatings."

Chem. Abst., vol. 67: 33287K, Sekmakas et al., "Alkylol Amide Interpolymers."

WILLIAM H. SHORT, Primary Examiner

EDWARD WOODBERRY, Assistant Examiner

U.S. Cl. X.R.

117—132; 260—16, 22, 31.8, 75, 860

PO-1050
(5/69)

UNITED STATES PATENT OFFICE
CERTIFICATE OF CORRECTION

Patent No. 3,558,563　　　　　　　　Dated January 26, 1971

Inventor(s) Arthur L. Cunningham

It is certified that error appears in the above-identified patent and that said Letters Patent are hereby corrected as shown below:

In Claim 4, Column 9, Line 12, after the word "contains" insert -- 1 to -- so that the phrase reads "group contains 1 to 4 carbon atoms".

In Claim 10, Column 9, Line 28, cancel "an" before "hydroxyl and insert in lieu thereof -- a resinous --.

Signed and sealed this 4th day of May 1971.

(SEAL)
Attest:

EDWARD M. FLETCHER, JR.　　　　WILLIAM E. SCHUYLER, JR
Attesting Officer　　　　　　　　Commissioner of Patents